United States Patent
Kiryu

(10) Patent No.: US 6,565,817 B1
(45) Date of Patent: May 20, 2003

(54) REFORMER FOR A FUEL CELL

(75) Inventor: Koji Kiryu, Aichi-ken (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/148,157

(22) Filed: Sep. 4, 1998

(30) Foreign Application Priority Data

Sep. 4, 1997 (JP) .............................................. 9-257901

(51) Int. Cl.$^7$ .................................................. B01J 8/02
(52) U.S. Cl. ........................... 422/220; 422/211; 48/61; 48/127.9; 48/199 FM; 423/652; 429/17; 429/19
(58) Field of Search .................. 48/61, 127.9, 199 FM; 423/650, 651, 652; 429/12, 17, 19, 22, 23, 24, 25, 26; 422/211, 220, 187, 192

(56) References Cited

U.S. PATENT DOCUMENTS

| | | | | |
|---|---|---|---|---|
| 3,955,941 A | * | 5/1976 | Houseman et al. ............. | 48/95 |
| 3,971,847 A | | 7/1976 | Houseman | |
| 4,381,187 A | * | 4/1983 | Sederquist ................... | 252/373 |
| 5,248,566 A | * | 9/1993 | Kumar et al. ................. | 429/19 |
| 5,249,624 A | * | 10/1993 | Pow et al. ..................... | 122/40 |
| 5,401,589 A | * | 3/1995 | Palmer et al. ................ | 429/13 |
| 5,432,020 A | * | 7/1995 | Fleck .......................... | 429/13 |
| 5,658,681 A | * | 8/1997 | Sato et al. .................... | 429/13 |
| 5,676,911 A | * | 10/1997 | Baumert et al. ............. | 165/164 |
| 5,766,786 A | * | 6/1998 | Fleck et al. .................... | 429/17 |
| 5,989,739 A | * | 11/1999 | Zur Megede et al. ......... | 429/13 |
| 6,045,772 A | * | 4/2000 | Szydlowski et al. ........ | 422/211 |
| 6,284,398 B1 | | 4/2001 | Kiryu | |

FOREIGN PATENT DOCUMENTS

| | | |
|---|---|---|
| DE | 2 008 489 | 9/1971 |
| DE | 197 27 841 | 1/1999 |
| JP | 60-49569 | 3/1985 |
| JP | 3-252062 | 11/1991 |

OTHER PUBLICATIONS

"Partial Oxidation Reforming of Methanol", Krumpelt et al., Apr. 2–3, 1996.

* cited by examiner

Primary Examiner—Marian C. Knode
Assistant Examiner—Basia Ridley
(74) Attorney, Agent, or Firm—Oblon, Spivak, McClelland, Maier & Neustadt, P.C.

(57) ABSTRACT

In a reformer for a fuel cell equipped with a reforming unit 7 using a reaction system composed of a partial oxidation reaction and a steam reforming reaction as a reforming reaction, the reformer includes a vaporizing device 4 for vaporizing a raw fuel using a mixture of liquid hydrocarbon such as gasoline or alcohol and water and for supplying the vaporized fuel to the reforming unit 7. A spray nozzle 6 atomizes the raw fuel and supplies the atomized fuel to the reforming unit 7, and a blowing machine 9 supplies air to the reforming unit 7.

15 Claims, 8 Drawing Sheets

REFORMER FOR A FUEL CELL

BACKGROUND OF THE INVENTION

1. Field of the Invention

The present invention is based upon Japanese patent application no. 09-257901, filed on Sep. 4, 1997, which is hereby incorporated by reference in its entirety.

The present invention relates to a reformer for a fuel cell, which enables responsive and sufficient vaporization of fuel and enables heat input to follow an abrupt load variation. The reformer is equipped with a reforming unit using a reaction system having a partial oxidation reaction and a steam reforming reaction as a reforming reaction. The reformer further comprises a vaporizing device for vaporizing a raw fuel, which uses a mixture of liquid hydrocarbon such as gasoline or alcohol and water, and an atomizing device for atomizing the raw fuel. The vaporized and atomized fuel is supplied to the reforming unit, and a blowing machine supplies air to the reforming unit.

2. Description of the Related Art

As shown in FIG. 7, since it is necessary to raise the responsiveness of hydrogen supply to a fuel cell to changes in load, a conventional fuel cell power plant (Japanese Patent Unexamined Pub. No. Sho. 60-49569) is constructed such that a fuel tank T as a storage means of a reformed gas or hydrogen is provided between a reforming unit K for reforming a raw fuel to produce the reformed gas rich in hydrogen and a power generating unit H of a main unit of the fuel cell, and the reformed gas or hydrogen is directly supplied to the power generating unit H of the fuel cell from the fuel tank T according to the variation of output.

In another conventional fuel cell power generating apparatus (Japanese Patent Unexamined Pub. No. Hei. 3-252062), as shown in FIG. 8, since improving the responsiveness in vaporization of methanol as a raw fuel fed to a reforming unit K is important for improving the responsiveness of a power generating device H of the fuel cell, a vaporizing device is proposed for atomizing the fuel at a nozzle N, as a means of improving heat conductivity in a vaporizing unit C. A heat exchanger E cools down the heat exchange medium so as to maintain the operating temperature of the power generating device H. An atomized raw fuel is blown by the nozzle N to a heat conductive surface in a heat exchanger for evaporation, and the raw fuel forms a thin and uniform layer on the heat conductive surface, so that the performance of heat exchange is improved and the responsiveness in the evaporation amount is raised.

Moreover, an article "Partial Oxidation Reforming of Methanol" in which reforming of methanol is carried out by using a partial oxidation reaction was published in "1996 EPRI/GRI Fuel Cell Workshop on Fuel Call technology & Development". However, the foregoing conventional fuel cell power plant has problems that, for example, in the case where the fuel cell using methanol as a raw fuel is used for a vehicle, the variation of output is large, so that its storage device becomes large or the responsiveness of vaporization of methanol can not follow the variation.

In the conventional fuel cell power generating apparatus, since raw fuel is sprayed by the nozzle, there is required such a wide surface that an atomized raw fuel is effectively attached to the heat conductive surface. Since heat conduction of a combustion gas is dominant on the heating side of the vaporizer, the performance of heat conduction is much inferior to the inside of the vaporizer. Thus, the conventional apparatus has a disadvantage that the temperature in the vaporizer and at the heat conduction surface is abruptly lowered by the latent heat of evaporation of a large amount of sprayed methanol in response to the abrupt increase of a load, so that sufficient vaporization can not be carried out.

In the foregoing conventional fuel cell power generating apparatus, heat supply to the heat conduction surface requires heat at least equivalent to the evaporation heat of the raw fuel sprayed by the nozzle. Thus, as a system of the fuel cell, a phosphoric acid type or a solid fused-salt type having a high waste-heat temperature becomes a candidate. However, for use in a moving body such as a vehicle, a solid high polymer film type (generally called PEM), which operates at a low temperature and can be made small and light, is advantageous. However, since the waste-heat temperature is 10° C. or less in a PEM fuel cell, evaporation by waste heat becomes difficult.

Thus, although the burner waste heat obtained by burning a fuel cell exhaust gas and the like is used for heat supply, a heat shortage is expected. In direct heat supply by a burner exhaust gas, heat conduction is from gas to solid, so that the performance of heat conduction is much lower than that at the evaporation side, and a wide area heat conduction surface is required for sufficient heat supply. In this case, the size of a heat exchanger is increased, and when a heat medium is used for heat supply at a nozzle, an additional heat exchanger is required, so that the system becomes large and is unsuitable for use in a moving body such as a vehicle.

Further, a reforming reaction in the reforming unit becomes an endoergic reaction by only a conventional steam reforming method, so that there is a problem that heat supply from the outside is always necessary, and heat input cannot follow an abrupt load variation.

SUMMARY OF THE INVENTION

It is an object of the invention to provide a reformer of a fuel cell which is responsive to abrupt load variations and provides sufficient vaporization of the fuel.

According to a first aspect of the present invention, a reformer for a fuel cell comprises a reforming unit including a reaction system using a partial oxidation reaction and a steam reforming reaction; a vaporizing device for vaporizing a raw fuel using a mixture of liquid hydrocarbon and water, the vaporizing device communicating with the reforming unit so as to supply the vaporized fuel to the reforming unit; an atomizing device for atomizing the raw fuel and communicating with the reforming unit so as to supply the atomized fuel to the reforming unit; and a blowing machine communicating with the reforming unit so as to supply air to the reforming unit.

According to a second aspect of the present invention, the reformer includes control means for controlling the amount of raw fuel supplied by the atomizing device to the reforming unit and the amount of air supplied from the blowing machine in response to the load variation of the fuel cell.

According to a third aspect of the present invention, the vaporizing device receives hydrogen combustion heat of an exhaust gas from the power generating unit, to vaporize the raw fuel.

According to a fourth aspect of the present invention, the blowing machine includes a blower or a compressor, and the atomizing device includes an air assist type nozzle coupled to the blower or the compressor.

According to a fifth aspect of the present invention, the atomizing device includes an ultrasonic pulverizing device using an ultrasonic vibration.

In the foregoing reformer for the fuel cell of the first aspect equipped with the reforming unit using the reaction system composed of partial oxidation reaction and steam reforming reaction as the reforming reaction, the vaporizing device vaporizes the raw fuel using the mixture of liquid hydrocarbon such as gasoline or alcohol and water and supplies the vaporized fuel to the reforming unit. The atomizing device atomizes the raw fuel and supplies the atomized fuel to the reforming unit. The blowing machine supplies air to the reforming unit so that the reforming unit reforms the vaporized and atomized raw fuel into a gas rich in hydrogen. Thus, the reformer has the effect of enabling the responsive and sufficient vaporization.

According to the foregoing second aspect, the reformer enables responsive and sufficient vaporization and enabling the heat input to follow abrupt load variations.

According to the third aspect, heat supply from the outside becomes unnecessary.

According to the fourth and fifth aspects, the reformer atomizes the raw fuel.

DESCRIPTION OF THE PREFERRED EMBODIMENTS

Preferred embodiments of the present invention will now be described with reference to the drawings.

(First Embodiment)

Figure 1:
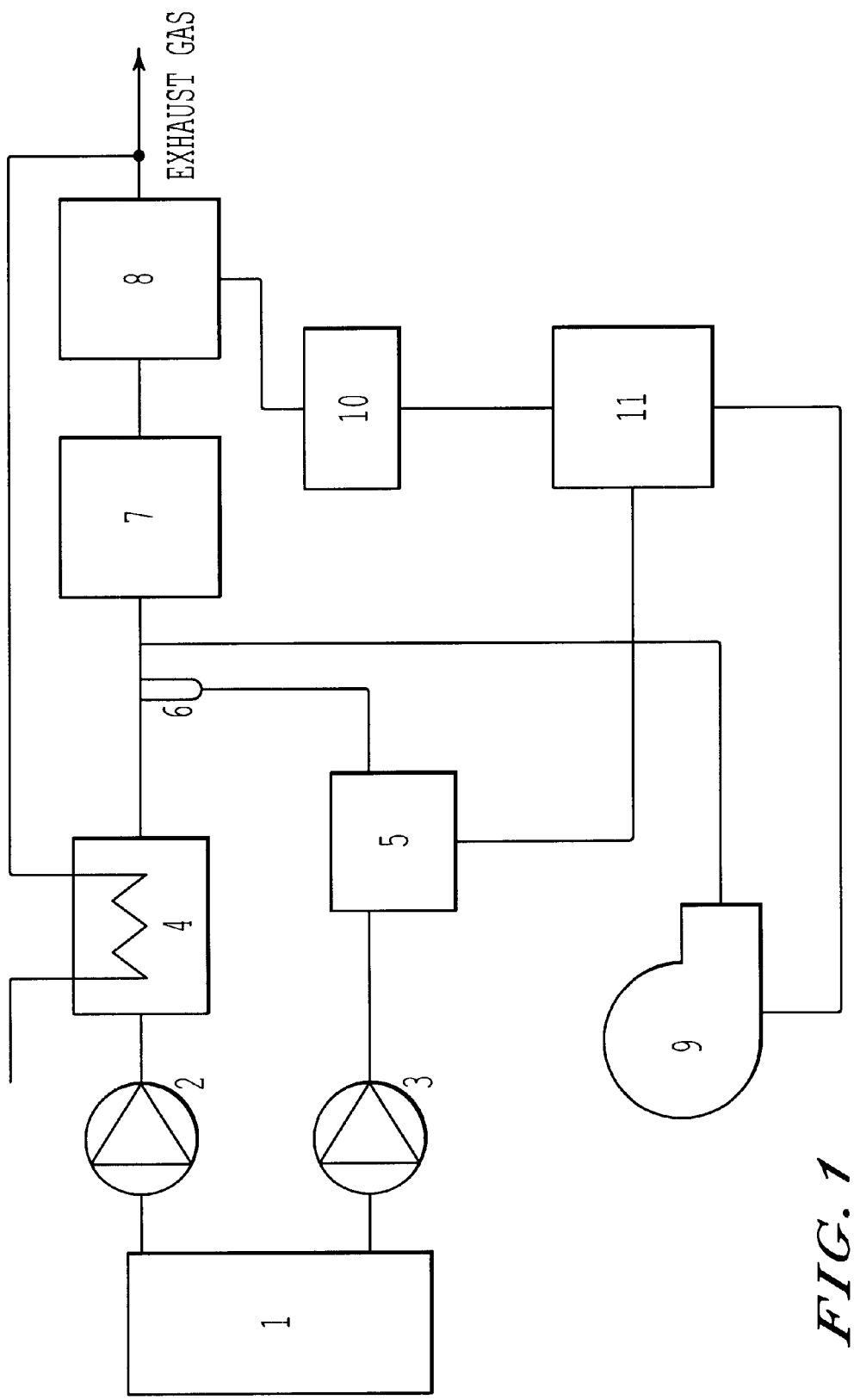
FIG. 1 is a block diagram showing a reformer for a fuel cell according to a first embodiment of the present invention.
Figure 2:
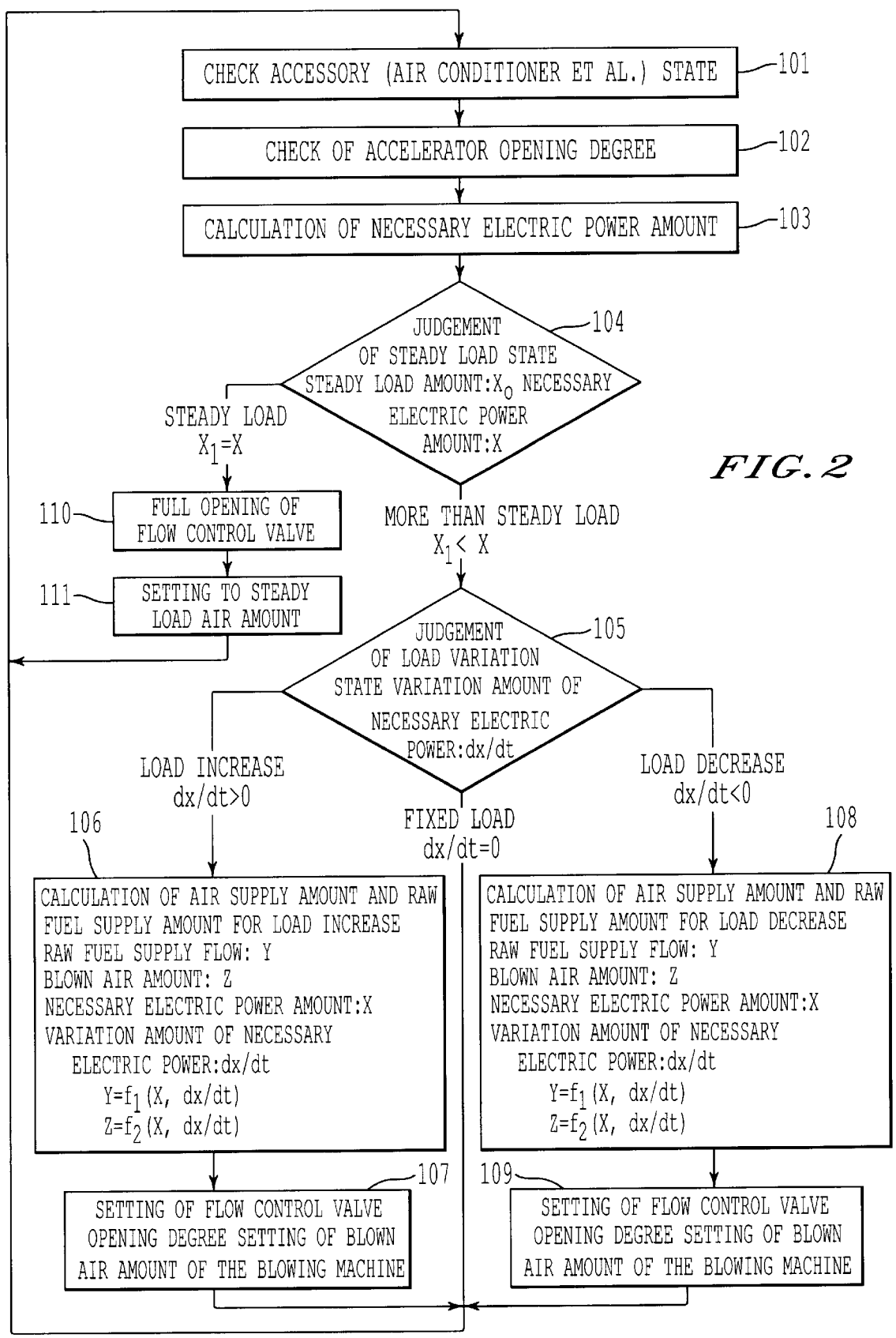
FIG. 2 is a flow chart showing the flow of control corresponding to the load variation of the reformer of the first embodiment.

As shown in FIGS. 1 and 2, a reformer for a fuel cell according to a first embodiment is equipped with a reforming unit 7 using a reaction system composed of a partial oxidation reaction and a steam reforming reaction as a reforming reaction. A vaporizing device 4 vaporizes raw fuel using a mixture of liquid hydrocarbon such as gasoline or alcohol and water and supplies the vaporized fuel to the reforming unit 7. A spray nozzle 6 as an atomizing device atomizes the raw fuel and supplies the atomized fuel to the reforming unit 7. A blowing machine 9 supplies air to the reforming unit 7.

The vaporizing device 4 vaporizes the raw fuel stored in a tank I and supplied by a pump 2, by using the combustion heat of hydrogen in an exhaust gas line from a power generating unit 8 of the fuel cell, so as to supply fuel for a steady load of the fuel cell.

The spray nozzle 6 is constructed to atomize the raw fuel which was stored in the tank 1 and supplied by the pump 3, the flow thereof being controlled by a flow control valve 5, and to supply the raw fuel in the atomized state to the reforming unit 7.

The blowing machine 9 is constructed to supply air of an amount corresponding to the steady load of the fuel cell to the reforming unit 7.

A load variation detector 10 is constructed to detect the variation of a load of a power generating unit 8 of the fuel cell. The detected load variation is supplied to a control device 11. The control device 11 outputs a control signal corresponding to the load variation to the flow control valve 5, and the flow of the raw fuel is controlled by the flow control valve 5.

Referring to FIG. 2, in the foregoing load variation detection, in step 101 the state of an air conditioner and other accessories is checked. In step 102, an accelerator opening degree is checked, and in step 103, an amount of necessary electric power is calculated.

In step 104, it is judged whether or not the amount X of calculated necessary electric power is larger than an amount $X_o$ of steady load, and whether or not the state is a steady load state. If the amount X of necessary electric power is larger than the steady load amount $X_o$, an amount of change of necessary electric power dX/dt is calculated in step 105.

In the case where the amount of change of necessary electric power dX/dt is larger than zero and the load is increasing, a supply amount Z of blown air and a supply flow Y of the raw fuel which correspond to the increase of the load are calculated in step 106 on the basis of the amount X of necessary electric power and the amount of change of necessary electric power dX/dt, where:

$$Y=f_1(X, dX/dt),$$

$$Z=f_2(X, dX/dt).$$

In step 107, the air blowing amount of the blowing machine 9 and the opening degree of the flow control valve 5 are respectively set on the basis of the calculated air supply amount Z and the raw fuel supply flow Y.

In the case where the amount of change of necessary electric power dX/dt is less than zero and the load is decreasing, the air supply amount Z and the raw fuel supply flow Y which correspond to the decrease of the load are calculated in step 108 on the basis of the amount X of necessary electric power and the amount of change of necessary electric power dX/dt, where:

$$Y=f_1(X, dX/dt),$$

$$Z=f_2(X, dX/dt).$$

In step 109, the air blowing amount of the blowing machine 9 and the opening degree of the flow control valve 5 are respectively set on the basis of the calculated air supply amount Z and the raw fuel supply flow Y.

In the case of a steady load where the amount X of necessary electric power is equal to the steady load amount $X_o$, the flow control valve 5 is fully opened in step 110, and in step 111 the air blowing amount of the blowing machine 9 is set to the steady load air amount.

In the reformer according to the first embodiment, the raw fuel for the fuel cell is fed to the vaporizer 4 from the tank 1 by the pump 2, and is fed into the reforming unit 7 as a vaporized raw fuel. At this time, air from the blowing machine 9 is mixed with the vaporized raw fuel supplied from the vaporizer 4 for a reforming reaction in the reforming unit 7. Thereafter, the raw fuel is reformed by the reforming unit 7 into a gas rich in hydrogen, and is supplied to the fuel cell power generating unit 8 where the fuel is converted into electrical output, and an exhaust gas is exhausted. At this time, the raw fuel fed to the vaporizer 4 and the air from the blowing machine 9 are supplied with flows corresponding to the steady load in FIG. 2.

Figure 3:
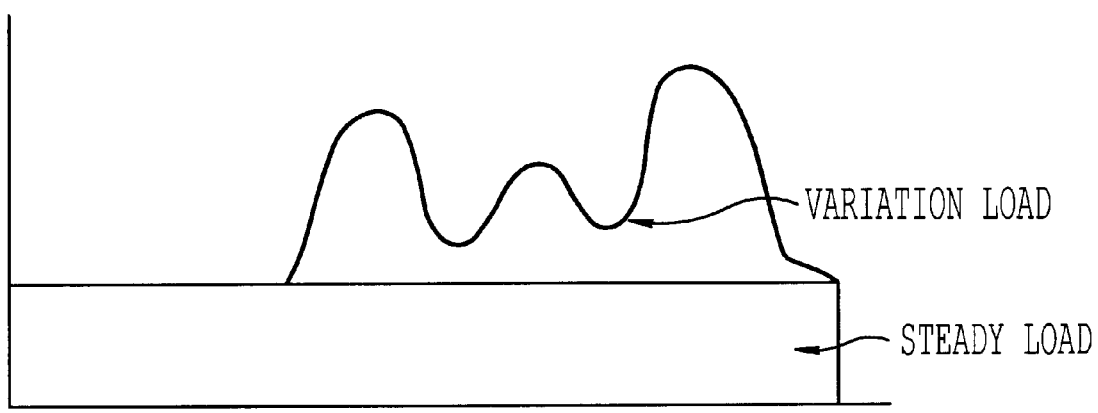
FIG. 3 is a diagram showing the load variation of the fuel cell in the first embodiment.

Next, in the case where a load variation occurs, the load variation detector 10 detects the variation amount of the variation load shown in FIG. 3, in which the foregoing steady load is removed from the total load. The flow of the raw fuel is controlled by the flow control valve 5 on the basis of a control signal from the control device 11, and the raw fuel with a flow corresponding to the variation amount is supplied to the spray nozzle 6. The spray nozzle 6 atomizes the supplied raw fuel, and the fuel in the atomized state is mixed with the vaporized raw fuel supplied from the vaporizing device 4 and is supplied to the reforming unit 7. At this time, the amount of air supplied from the blowing machine 9 is set to an amount correspond to both the variation load and the steady load.

The amount of raw fuel and the amount of air per unit load amount corresponding to the variation load may be different from the amount of raw fuel and the amount of air per unit load amount at the steady load, since the amount of latent heat required for the evaporation of the raw fuel is provided in the reforming unit 7 by the heat generated by the oxidation reaction of the raw fuel.

In the foregoing reformer for the fuel cell of the first aspect having the foregoing operation and equipped with the reforming unit 7 using the reaction system composed of the partial oxidation reaction and the steam reforming reaction as the reforming reaction, the vaporizing device 4 vaporizes a raw fuel using a mixture of liquid hydrocarbon such as gasoline or alcohol and water, and supplies the vaporized fuel to the reforming unit 7. The spray nozzle 6 as the atomizing device atomizes the raw fuel and supplies the atomized fuel to the reforming unit 7, and the blowing machine 9 supplies air to the reforming unit 7, so that the reforming unit 7 reforms the vaporized and atomized raw fuel into a gas rich in hydrogen. Thus, the reformer enables a responsive and sufficient vaporization.

That is, in the first embodiment, since the reforming unit 7 uses the partial oxidation method in which it is not necessary to completely vaporize the raw fuel, the direct supply of raw fuel in the atomized state becomes possible, and a conventional heat exchanger for evaporation becomes unnecessary. Thus, it is possible to reduce the size of the system and the responsiveness delay by heat exchange for evaporation completely disappears. Accordingly, the reformer of this embodiment is particularly suitable for a moving body such as a vehicle in which very quick responsiveness is required and size restrictions are severe.

Moreover, in the reformer for the fuel cell of the first embodiment, the control device 11 controls the amount of raw fuel vaporized by the vaporizing device 4 and supplied to the reforming unit 7 to supplement the fuel for the steady load of the fuel cell, and controls the flow of the raw fuel atomized and supplied by the spray nozzle 6 as the atomizing device and the amount of air supplied by the blowing machine in responsiveness to the load variation of the fuel cell. Thus, the reformer has the effects of enabling a responsive and sufficient vaporization and enabling the heat input to follow abrupt load variations.

Further, in the reformer for the fuel cell of the first embodiment, the vaporizing device 4 vaporizes the raw fuel by using the combustion heat of hydrogen in the exhaust gas from the power generating unit 8 of the fuel cell, so that supply of external heat for vaporization of the raw fuel becomes unnecessary.

Further, in the reformer for the fuel cell of the first embodiment, since the flow of the spray nozzle 6 is generally easily controlled, the reformer can readily follow a normal load variation.

Further, in the reformer for the fuel cell of the first embodiment, as a reaction system for improving the responsiveness of the reforming unit 7 itself, for example by the conventional technique of introducing excess water and air or oxygen for reforming methanol, the reforming unit itself performs the heat generation and absorption reactions and takes balance of heat income without heat exchange to the outside. Further, by using a reaction system (also called autothermal) composed of a partial oxidation reaction and a water/gas shift reaction, a responsiveness delay due to heat responsiveness in the reforming unit 7 does not become a problem so that the reformer enables a sufficient improvement in responsiveness.

(Second Embodiment)

Figure 4:
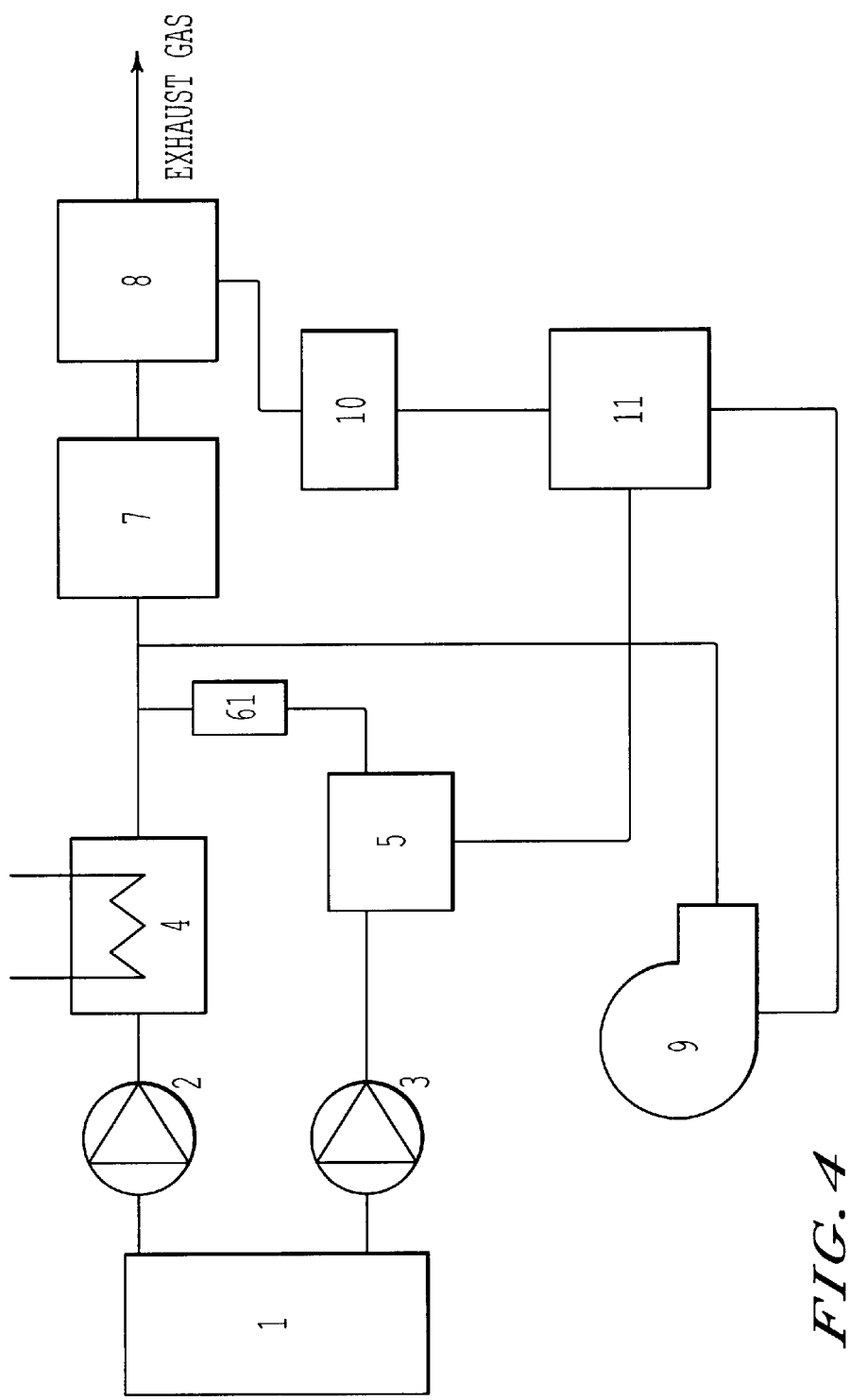
FIG. 4 is a block diagram sowing a reformer for a fuel cell according to a second embodiment of the present invention.
Figure 5:
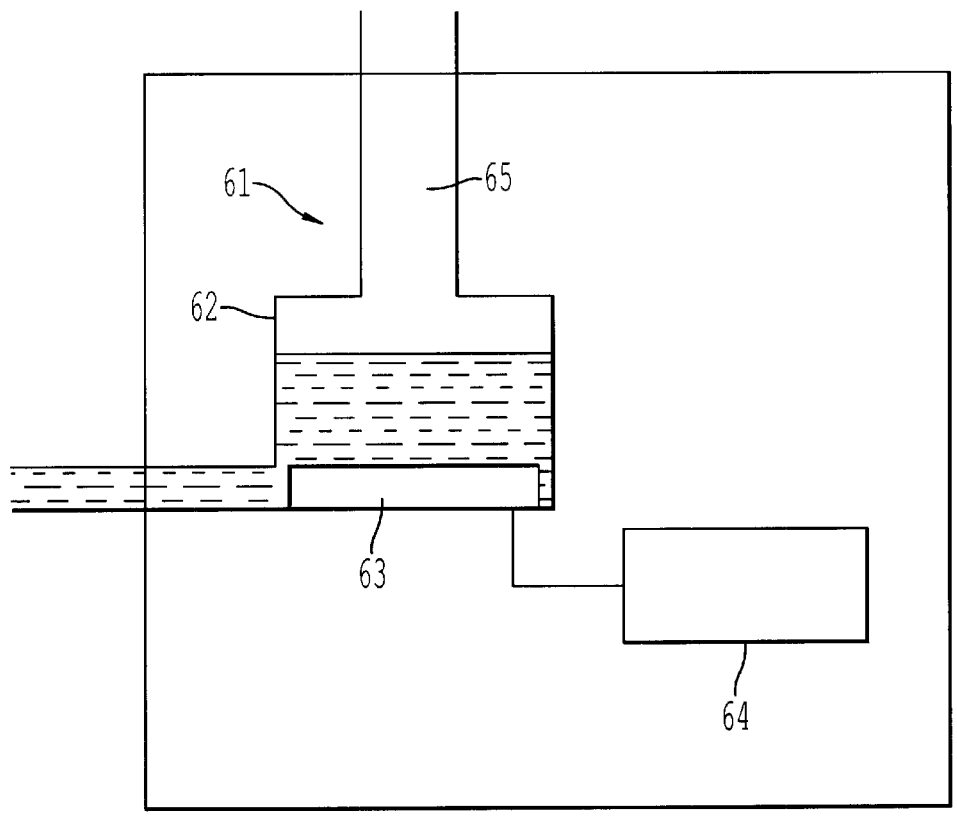
FIG. 5 is a sectional view showing an ultrasonic pulverizing device of the second embodiment of the present invention.

As shown in FIGS. 4 and 5, a reformer for a fuel cell of a second embodiment is different from the first embodiment in that an ultrasonic atomizing device 61 is used instead of the spray nozzle 6 as the atomizing device of the first embodiment. The description will be made mainly to the difference.

As shown in FIG. 5, the ultrasonic atomizing device 61 includes an ultrasonic element 63 disposed on the bottom of a container 62 in which a raw fuel, the amount of which is controlled by a flow control valve 5, is supplied and contained, and an ultrasonic element operation control device 64 for controlling the ultrasonic vibration of the ultrasonic element 63. The atomized raw fuel is supplied from an upper supply port 65 to the reforming unit 7.

The reformer for the fuel cell of the second embodiment having the foregoing structure has the effects that, since the ultrasonic atomizing device constituting the atomizing device atomizes the raw fuel by using ultrasonic vibration, the atomization of the raw fuel is facilitated and the ideal reforming in the reforming unit 7 is made possible.

(Third Embodiment)

Figure 6:
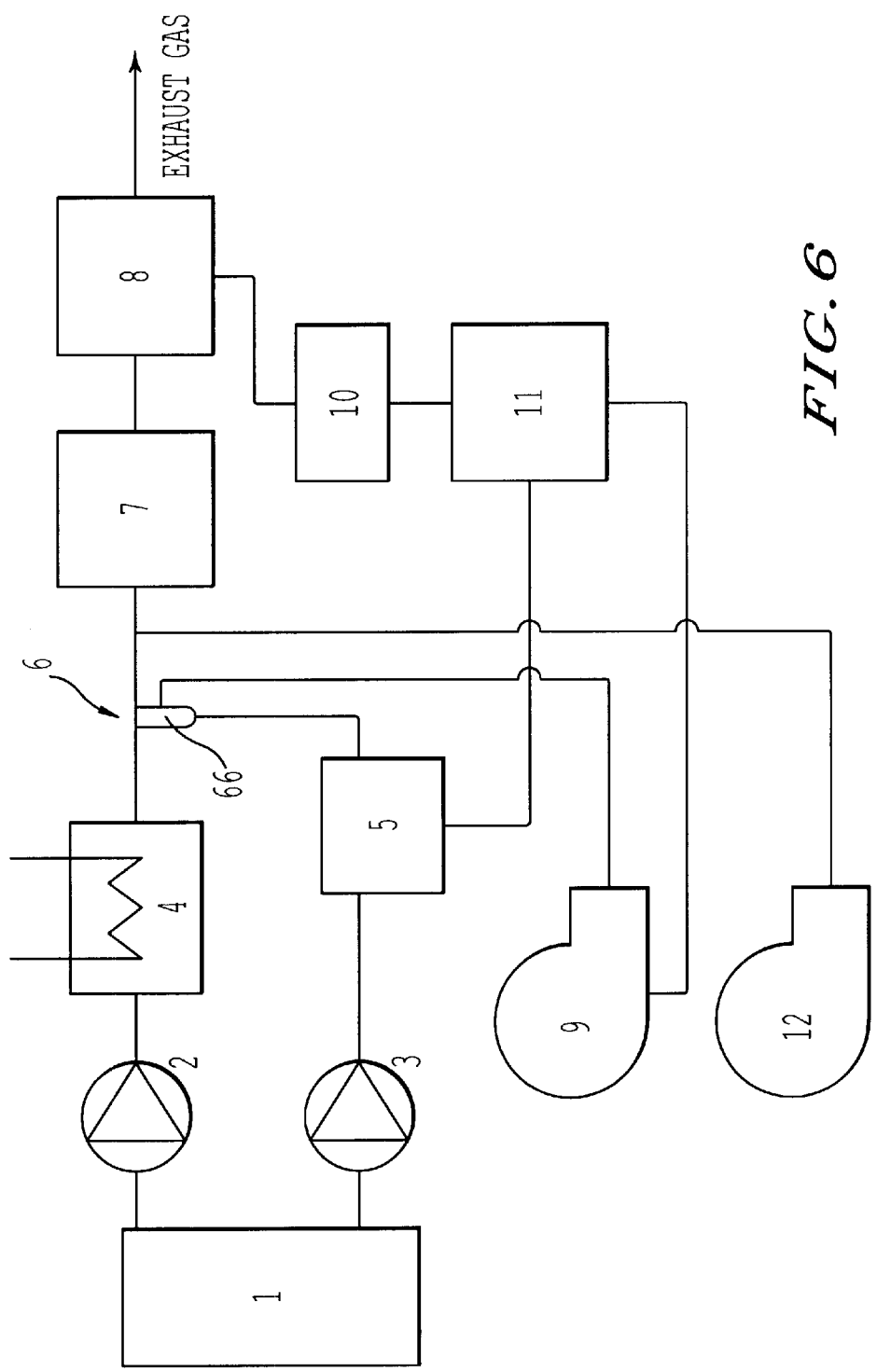
FIG. 6 is a block diagram sowing a reformer for a fuel cell according to a third embodiment of the present invention.
Figure 7:
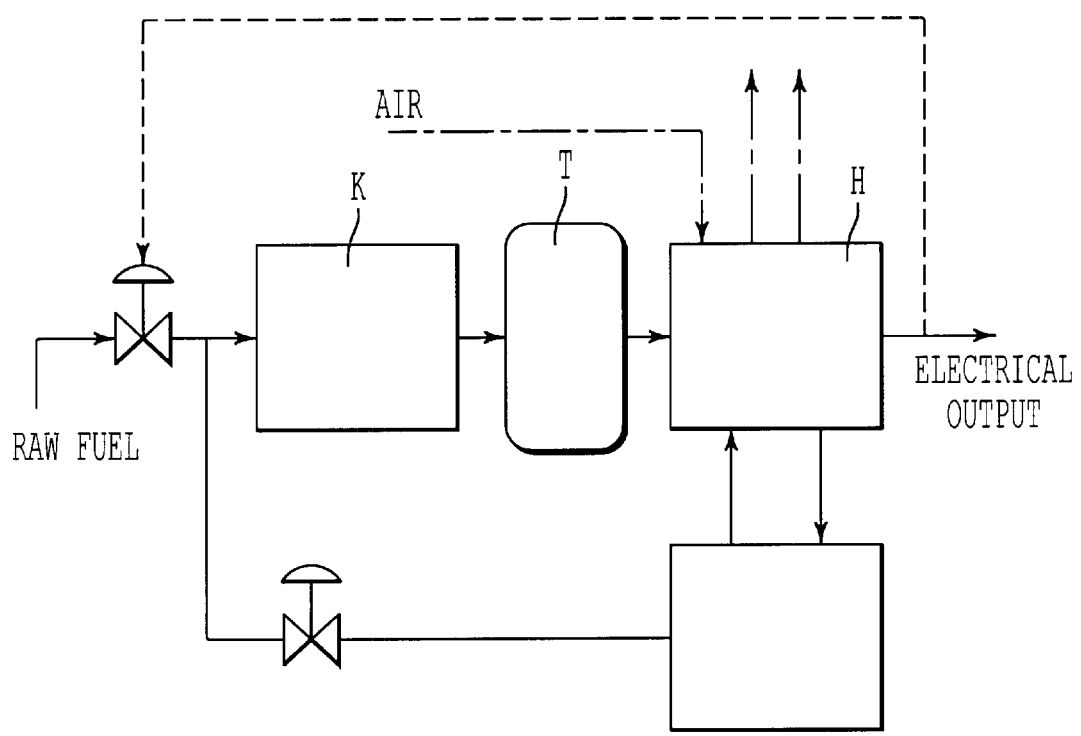
FIG. 7 is a block diagram showing a conventional fuel cell power plant.
Figure 8:
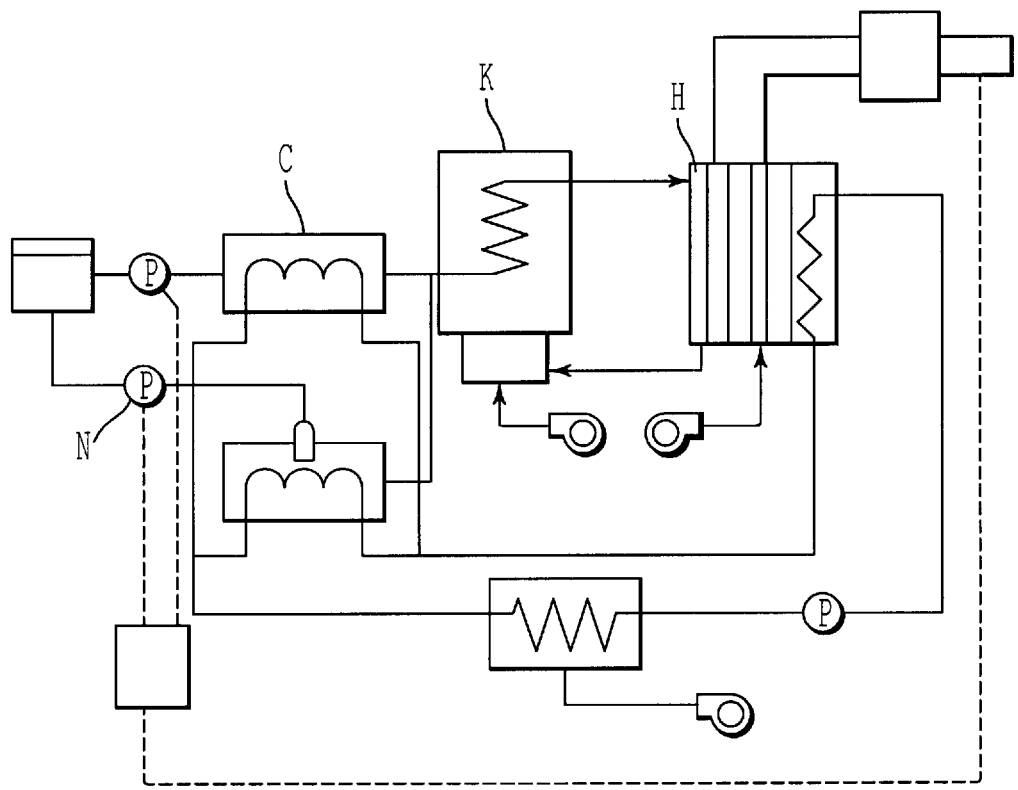
FIG. 8 is a block diagram showing a conventional fuel cell power generating device.

As shown in FIG. 6, a reformer for a fuel cell of a third embodiment is different from the first embodiment in that the spray nozzle 6 as the atomizing device in the first embodiment is replaced by a double fluid type nozzle 66 to improve the atomizing power. Description will be made below mainly to the difference.

As shown in FIG. 6, the double fluid type nozzle 66 is constituted as an air assist valve using assist air for the spray nozzle 6. The assist air is supplied from a blowing machine 9 by an amount corresponding to the variation load, and an amount of air corresponding to the steady load is supplied by a second blowing machine 12.

In the reformer for the fuel cell of the third embodiment having the foregoing structure, the raw fuel for the fuel cell is fed from a tank 1 by a pump 2 to a vaporizing device 4, and is supplied to a reforming unit 7 as a vaporized gas. At that time, air from the blowing machine 12 is mixed to the vaporized gas from the vaporizing device 4. Thereafter, the raw fuel is reformed into a gas rich in hydrogen by the reforming unit 7, and is supplied to a fuel cell power generating unit 8 where the fuel is converted into electrical output and an exhaust gas is exhausted. At this time, the raw fuel fed to the vaporizing device 4 and air from the blowing machine 12 are supplied with flows corresponding to the steady load in FIG. 3.

Next, in the case where a load variation occurs, the measure of the steady load is carried out as described before, and according to the control flow shown in FIG. 2, a load variation detector 10 detects the variation amount of the variation load shown in FIG. 3, in which the steady load is removed from the total load. The flow of the raw fuel corresponding to the variation amount is controlled by a flow control valve 5 on the basis of instructions from a control device 11. Similarly, air of an amount corresponding to the load variation amount is supplied from the blowing machine 9 to the double fluid type nozzle 66 as the spray nozzle.

In the double fluid type nozzle 66, the supplied raw fuel is atomized, and the fuel in the atomized state is mixed with the vaporized raw fuel fed from the vaporizing device 4 and the mixture is supplied to the reforming unit 7. The amount of raw fuel and the amount of air per unit load amount corresponding to the variation load amount may be different from the amount of raw fuel and the amount of air a unit load amount at the steady load since the amount of latent heat required for the evaporation of the raw fuel is provided in the reforming unit by the heat generated by the oxidation reaction of the raw fuel.

In the reformer for the fuel cell of the third embodiment having the foregoing operation, the atomizing device is constituted by the air assist type nozzle connected to the blower or the compressor constituting the blowing machine, so that the raw fuel is effectively atomized by the assist air and atomization is facilitated.

Moreover, in the reformer for the fuel cell of the third embodiment, air of the amount corresponding to the load variation amount is supplied from the blowing machine 9 to the double fluid type nozzle 66 as the spray nozzle 6, so that the reformer has the effect of enabling one to follow the load variation.

The foregoing embodiments have been exemplified for explanation, and the present invention is not limited thereto, but the present invention can he modified and added with something as long as it does not contradict the technical concept of the present invention recognized from the claims, the detailed description, and the drawings.

What is claimed is:

1. A reformer for a fuel cell, comprising:
   a reforming unit including a reaction system which provides a partial oxidation reaction and a steam reforming reaction;
   a vaporizing device located outside of said reforming unit for vaporizing a raw fuel comprising a mixture of fuel and water in a first feed line, the vaporizing device communicating with an inlet of the reforming unit so as to supply the vaporized raw fuel to the reforming unit;
   in addition to the vaporizing device, an atomizing device for atomizing a raw fuel comprising a mixture of fuel and water in a second feed line, the atomizing device communicating with the inlet of the reforming unit so as to supply the atomized raw fuel to the reforming unit; and
   a blowing machine communicating with the inlet of the reforming unit so as to supply air to the reforming unit.

2. The reformer as claimed in claim 1, further comprising control means for controlling an amount of raw fuel supplied by the atomizing device to the reforming unit and an amount of air supplied from the blowing machine in response to a load variation of the fuel cell.

3. The reformer as claimed in claim 1, further comprising a power generating unit, wherein the vaporizing device receives hydrogen combustion heat of an exhaust gas from the power generating unit, to vaporize the raw fuel.

4. The reformer as claimed in claim 1, wherein the blowing machine includes one of a blower and a compressor, and wherein the atomizing device comprises an air assist nozzle coupled to the blower or the compressor.

5. The reformer as claimed in claim 1, wherein the atomizing device comprises an ultrasonic atomizing device.

6. A reformer for a fuel cell, comprising:
   a reforming unit including a reaction system which provides a partial oxidation reaction and a steam reforming reaction;
   a vaporizing device located outside of said reforming unit for vaporizing a raw fuel comprising a mixture of fuel and water in a first feed line, the vaporizing device having a heating device independent of the reforming unit and communicating with an inlet of the reforming unit so as to supply the vaporized raw fuel to the reforming unit;
   an atomizing device for atomizing a raw fuel comprising a mixture of fuel and water in a second feed line, the atomizing device communicating with the inlet of the reforming unit so as to supply the atomized raw fuel to the reforming unit; and
   a blowing machine communicating with the inlet of the reforming unit so as to supply air to the reforming unit.

7. The reformer as claimed in claim 6, further comprising control means for controlling an amount of raw fuel supplied by the atomizing device to the reforming unit and an amount of air supplied from the blowing machine in response to a load variation of the fuel cell.

8. The reformer as claimed in claim 6, further comprising a power generating unit, wherein the vaporizing device receives hydrogen combustion heat of an exhaust gas from the power generating unit, to vaporize the raw fuel.

9. The reformer as claimed in claim 6, wherein the blowing machine includes one of a blower and a compressor, and wherein the atomizing device comprises an air assist nozzle coupled to the blower or the compressor.

10. The reformer as claimed in claim 6, wherein the atomizing device comprises an ultrasonic atomizing device.

11. A reformer for a fuel cell, comprising:
    a reforming unit including a reaction system which provides a partial oxidation reaction and a steam reforming reaction;
    a vaporizing device located outside of said reforming unit for vaporizing a raw fuel comprising a mixture of fuel and water in a first feed line, the vaporizing device having means for converting substantially all of the raw fuel supplied in the vaporizing device to a vapor and communicating with an inlet of the reforming unit so as to supply the vaporized raw fuel to the reforming unit;
    an atomizing device for atomizing a raw fuel comprising a mixture of fuel and water in a second feed line, the atomizing device communicating with the inlet of the reforming unit so as to supply the atomized raw fuel to the reforming unit; and
    a blowing machine communicating with the inlet of the reforming unit so as to supply air to the reforming unit.

12. The reformer as claimed in claim 11, further comprising control means for controlling an amount of raw fuel supplied by the atomizing device to the reforming unit and an amount of air supplied from the blowing machine in response to a load variation of the fuel cell.

13. The reformer as claimed in claim 11, further comprising a power generating unit, wherein the vaporizing device receives hydrogen combustion heat of an exhaust gas from the power generating unit, to vaporize the raw fuel.

14. The reformer as claimed in claim 11, wherein the blowing machine includes one of a blower and a compressor, and wherein the atomizing device comprises an air assist nozzle coupled to the blower or the compressor.

15. The reformer as claimed in claim 11, wherein the atomizing device comprises an ultrasonic atomizing device.

* * * * *